(12) United States Patent
Tomazic

(10) Patent No.: US 6,759,158 B2
(45) Date of Patent: Jul. 6, 2004

(54) SYSTEM FOR PROCLUSION OF ELECTRICAL SHORTING

(75) Inventor: Gerd Tomazic, Murzzuchlag (AT)

(73) Assignee: Premium Power Corporation, Billerica, MA (US)

( * ) Notice: Subject to any disclaimer, the term of this patent is extended or adjusted under 35 U.S.C. 154(b) by 351 days.

(21) Appl. No.: 10/038,044

(22) Filed: Jan. 3, 2002

(65) Prior Publication Data

US 2003/0124415 A1 Jul. 3, 2003

(51) Int. Cl.[7] .............................................. H01M 10/48

(52) U.S. Cl. ............................. 429/61; 429/90; 429/51; 320/136

(58) Field of Search .............................. 429/61, 90, 51; 320/136

(56) References Cited

U.S. PATENT DOCUMENTS 3,942,104 A * 3/1976 Byrne ......................... 324/439
5,650,239 A * 7/1997 Lex et al. ..................... 429/49

* cited by examiner

Primary Examiner—John S. Maples
(74) Attorney, Agent, or Firm—Ropes & Gray, LLP

(57) ABSTRACT

The invention comprises a system for identifying an electrical short in a flowing electrolyte battery. The system for identifying an electrical short in a flowing electrolyte battery comprises a detection device for detecting direction of current flow through the battery, wherein the flow of current in a first direction is indicative of proper current flow and the flow of current in a second direction is indicative of an electrical short within at least a portion of the battery, and a switch, for example, for ceasing current flow upon detection of current flow in the second direction. The system further contemplates an identifying component which visually and/or audibly alerts an operator as to an electrical short.

23 Claims, 1 Drawing Sheet

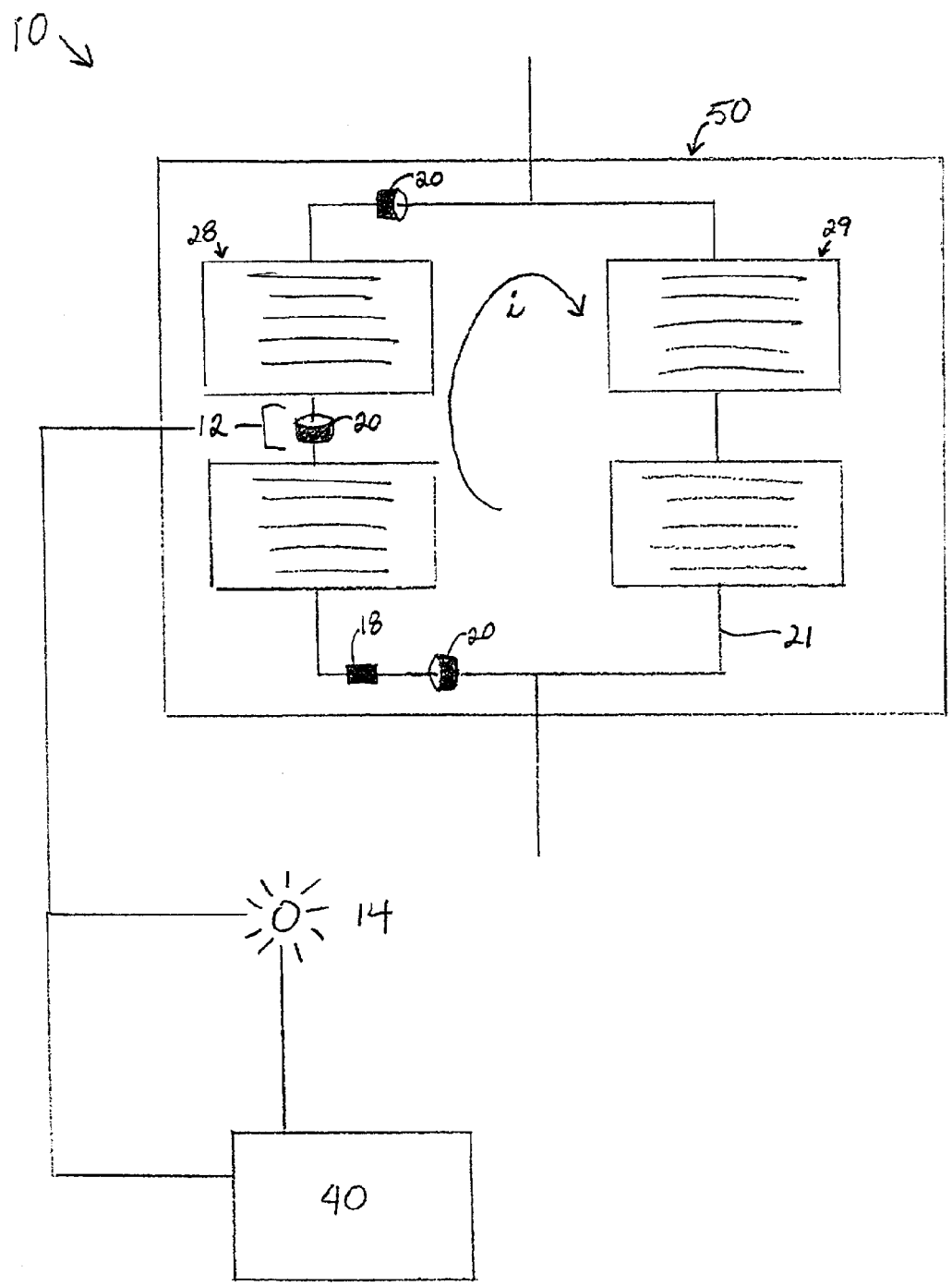

SYSTEM FOR PROCLUSION OF ELECTRICAL SHORTING

BACKGROUND OF THE INVENTION

1. Field of the Invention

The invention is directed to flowing electrolyte batteries, and in particular to a system for proclusion of electrical shorting for use in association with flowing electrolyte batteries such as zinc/bromine batteries.

2. Background Art

Flowing electrolyte batteries (Zn—Br batteries, V-Redox batteries, etc) are well known in the art for their quality of power providing characteristics and their cycling ability. Generally, such batteries rely on the circulation, by pumps, of electrolyte from containment reservoirs to individual stack components. The contribution of the individual stack components to the internal resistance of the stack should be very constant and the same for all of the stacks. However, sometimes differences in the respective resistances of the stacks can occur. For example, the stripping of cells, ring currents and shunt currents all can contribute to creating a difference in the internal resistance of a given stack.

Generally, if one stack differs in internal resistance from the others, it will eventually draw upon the current from one of the other stacks to drive it. That is, the flow of current within the system of stacks will reverse in direction. This is problematic because reversal of current flow ultimately results in an electrical shortage of the stack. Subsequent to shorting are numerous potential deleterious effects, namely, overheating, melting, fires, as well as the ultimate destruction of the entire battery or the device to which the battery supplies energy.

Thus, it is an object of the invention to provide a system to eliminate dangerous and damaging effects of electrical shorting in a flowing electrolyte battery by immediately detecting a reversal in direction of the flow of current.

It is a further object of the invention to provide a mechanism by which the charging of the entire flowing electrolyte battery is ceased upon the detection of a reversal in direction of the flow of current.

It is a further object of the invention to control a flowing electrolyte battery in a safe and reliable manner.

SUMMARY OF THE INVENTION

The invention comprises a system for identifying an electrical short in a flowing electrolyte battery. The system comprises: (a) means associated with the flowing electrolyte battery for detecting direction of current flow through the battery, wherein the flow of current in a first direction is indicative of proper current flow and the flow of current in a second direction is indicative of an electrical short within at least a portion of the battery; and (b) means for ceasing current flow upon detection of current flow in the second direction.

In a preferred embodiment, the flow detection means includes a device capable of sensing an electro-magnetic field associated with at least a portion of the battery. In such an embodiment, the flow detection means is associated with at least one electrical conduit associated with the flowing electrolyte battery. The electrical conduit may comprise a wire or a cable.

In another embodiment, the flow detection means includes a ring sensor.

In yet another embodiment, the flow detection means includes as least one of a digital or analogue sensor.

In still another embodiment, the system further includes means for identifying the direction of current flow.

In a preferred embodiment, the identifying means includes an audible signal upon detection by the detecting means of the flow of current in the second direction.

In another embodiment, the identifying means includes a visual signal upon detection by the detecting means of the flow of current in the second direction.

In yet another embodiment, the identifying means includes an audible signal and a visual signal upon detection by the detecting means of the flow of current in the second direction.

In a preferred embodiment, the means for ceasing the flow of electric current comprises at least one of an electrical, electro-mechanical or mechanical switch.

In another aspect of the invention, the system for identifying an electrical short in a flowing electrolyte battery comprises: (a) means associated with the flowing electrolyte battery for detecting direction of current flow through a battery, wherein the flow of current in a first direction is indicative of proper current flow and the flow of current in a second direction is indicative of an electrical short within at least a portion of the battery; (b) means for ceasing current flow upon detection of current flow in the second direction; and (c) means for identifying the direction of current flow.

BRIEF DESCRIPTION OF THE DRAWINGS

FIG. 1 of the drawings is a schematic representation of the present invention.

BEST MODE OF THE INVENTION

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

Referring now to the figures, and in particular, FIG. 1, system 10 for identifying an electrical short in a flowing electrolyte battery 50 is provided. The system is well suited for use in association with flowing electrolyte batteries, and in particular, zinc/bromine flowing electrolyte batteries. Of course, other flowing electrolyte batteries may likewise take advantage of such an apparatus, and such use is certainly contemplated. It will be understood that the system is associated with at least one wire along which electrical current flows within or between various stacks of a flowing electrolyte battery.

System 10 for identifying an electrical short in a flowing electrolyte battery 50 is comprised of flow detection means 12 and identifying means 14. Flow detection means 12 serves to detect the direction of flow of electrical current within the battery. Specifically, the "proper" direction of current flow within the battery will be from a negative terminal to a positive terminal. Flow detection means 12 is capable of detecting such a direction of flow of current along a wire at a given point and subsequently characterizing it to be "proper." Flow detection means 12 located at the same given point is likewise capable of detecting a direction of flow of current in a direction counter to the "proper" direction, and subsequently characterizing it to be "improper." Flow detection means 12 can be comprised of any type of conventional sensor 20. Sensor 20, in turn, is associated with at least one wire 21 which connects battery stacks, such as stacks 28, 29. It is contemplated that several stacks may be associated with wire 21 either in series or in parallel, as would be readily understood by those having ordinary skill in the art. It is further contemplated that several sensors (such as sensor 20) may be associated with several points along wire 21 which carries the electric current to and between each of several various stacks. For example, a sensor may be placed along the wire on either side of any or all stacks within the flowing electrolyte battery. Placement between each stack would be advantageous in that the flow of electric current could be ceased should there be an "improper" direction of current flow resulting from a deleterious event within a given stack.

Ideally, flow detection means 12 is capable of continually sensing the direction of the flow of current. For example, sensor 20 may consist of a ring sensor, or any other type of conventional device which is capable of identifying current flow. A ring sensor, for example, is positioned about at least a portion of an electrical conduit (e.g., a wire) and senses the electromagnetic field, and, in turn, the direction in which the electrical current is traveling, i.e. from positive to negative, or from negative to positive. As will be further explained, the sensor will be associated with a contactor, such as switch 18, which is capable of ceasing the operation of the battery upon detection by the sensor that the flow of electrical current is going in the wrong/improper direction—a condition indicative of a "short" in one or more battery stacks. It will be understood to those having ordinary skill in the art that various switches may be employed, depending on the configuration of battery stacks and the situation in which the battery is utilized, so as to achieve the automatic cessation of current flow in the battery. Although the sensor has been identified as an electromagnetic sensor, it is contemplated that sensor 20 consists of any other conventional devices, including, but not limited to devices which are capable of performing mathematic computations so as to render the conclusion of "proper" or "improper" direction of current flow.

Identifying means 14 is associated with sensor 20 and serves as an audible and/or visual alert of an electrical short if the direction of flow of electrical current is not sensed in the "proper" direction. Any conventional identification device, including, but not limited to, L.E.D.'s, digital or analogue displays, piezo buzzers, sirens, etc. (proximally or remotely located) are contemplated for use.

Means 40 for ceasing the flow of electric current upon detection of flow of current in an "improper" direction by flow detecting means 12 is operatively associated with at least one of the detecting means itself, and/or identifying means 14. Such current cessation means can comprise any conventional device such as an electrically or mechanically activatable shut-off switch. Preferably, means 40 for ceasing current flow will be capable of automatically ceasing the flow of current upon the immediate detection of improper direction of current flow. However, it is also contemplated that an operator be able to manually cease current flow upon observance of a visual or audible signal from identifying means 14. As will be readily understood to those having ordinary skill in the art, actual operation and cooperation between the above-mentioned components can be easily accomplished by conventional circuitry and/or microprocessors.

The foregoing description merely explains and illustrates the invention and the invention should not be limited thereto except insofar as the appended claims are so limited, as those skilled in the art who have the present invention before them will be able to make modifications without departing from the scope of the invention.

What is claimed is:

1. A system for identifying an electrical short in a flowing electrolyte battery wherein the system comprises:

means associated with the flowing electrolyte battery for detecting direction of current flow through a battery, wherein the flow of current in a first direction is indicative of proper current flow and the flow of current in a second direction is indicative of an electrical short within at least a portion of the battery; and means for ceasing current flow upon detection of current flow in the second direction.

2. The system according to claim 1 wherein the flow detection means includes a device capable of sensing an electro-magnetic field associated with at least a portion of the battery.

3. The system according to claim 2 wherein the flow detection means is associated with at least one electrical conduit associated with the flowing electrical battery.

4. The system according to claim 3 wherein the electrical conduit comprises a wire or cable.

5. The system according to claim 2 wherein the flow detection means includes a ring sensor.

6. The system according to claim 1, wherein the flow detection means is associated with an electrical conduit.

7. The system according to claim 1 wherein the flow detection means includes at least one of a digital or analogue sensor.

8. The invention according to claim 1 wherein the system further includes means for identifying the direction of current flow.

9. The system according to claim 1 wherein the identifying means includes an audible signal upon detection by the detecting means of the flow of current in the second direction.

10. The system according to claim 1 wherein the identifying means includes a visual signal upon detection by the detecting means of the flow of current in the second direction.

11. The system according to claim 1 wherein the identifying means includes an audible signal and a visual signal upon detection by the detecting means of the flow of current in the second direction.

12. The system according to claim 1 whereby the means for ceasing the flow of electric current comprises at least one of an electrical, electro-mechanical or mechanical switch.

13. A system for identifying an electrical short in a flowing electrolyte battery wherein the system comprises:

means associated with the flowing electrolyte battery for detecting direction of current flow through a battery, wherein the flow of current in a first direction is indicative of proper current flow and the flow of current in a second direction is indicative of an electrical short within at least a portion of the battery;

means for ceasing current flow upon detection of current flow in the second direction; and means for identifying the direction of current flow.

14. The system according to claim 13 wherein the flow detection means includes a device capable of sensing an electro-magnetic field associated with at least a portion of the battery.

15. The system according to claim 14 wherein the flow detection means is associated with at least one electrical conduit associated with the flowing electrical battery.

16. The system according to claim 15 wherein the electrical conduit comprises a wire or cable.

17. The system according to claim 14 wherein the flow detection means includes a ring sensor.

18. The system according to claim 13, wherein the flow detection means is associated with an electrical conduit.

19. The system according to claim 13 wherein the flow detection means includes at least one of a digital or analogue sensor.

20. The system according to claim 13 wherein the identifying means includes an audible signal upon detection by the detecting means of the flow of current in the second direction.

21. The system according to claim 13 wherein the identifying means includes a visual signal upon detection by the detecting means of the flow of current in the second direction.

22. The system according to claim 13 wherein the identifying means includes an audible signal and a visual signal upon detection by the detecting means of the flow of current in the second direction.

23. The system according to claim 13 whereby the means for ceasing the flow of electric current comprises at least one of an electrical, electro-mechanical or mechanical switch.

* * * * *